Aug. 15, 1933.                R. H. LAPIDOS                1,922,483
PRIMARY ELECTRIC CELL
Filed Oct. 22, 1930

INVENTOR:
Robert H. Lapidos
BY Byrne Townsend
& Potter
ATTORNEYS.

Patented Aug. 15, 1933

1,922,483

UNITED STATES PATENT OFFICE 1,922,483

PRIMARY ELECTRIC CELL

Robert H. Lapidos, Lakewood, Ohio, assignor to National Carbon Company, Inc., a Corporation of New York Application October 22, 1930. Serial No. 490,503

4 Claims. (Cl. 136—86)

This invention relates to primary electric cells, and especially to cells which comprise a porous cathode exposed to and adapted to be acted on by atmospheric oxygen and thereby depolarized. Such a cathode is susceptible to impairment by water or other substances which might penetrate the electrode or prevent the permeation therethrough of the air necessary for its proper operation.

One of the principal objects of this invention is to provide a cell having a cover for electrodes of the type described which shall protect the electrode from detrimental contact with substances injurious to the function or life of the cell, and which shall allow access to and permeation of the electrode by the necessary gases of the atmosphere.

Another object of this invention is to provide a novel electrode cover for such cells.

Further novel features and advantages of this invention will be apparent from the following description and the accompanying drawing, in which.

Figure 1:
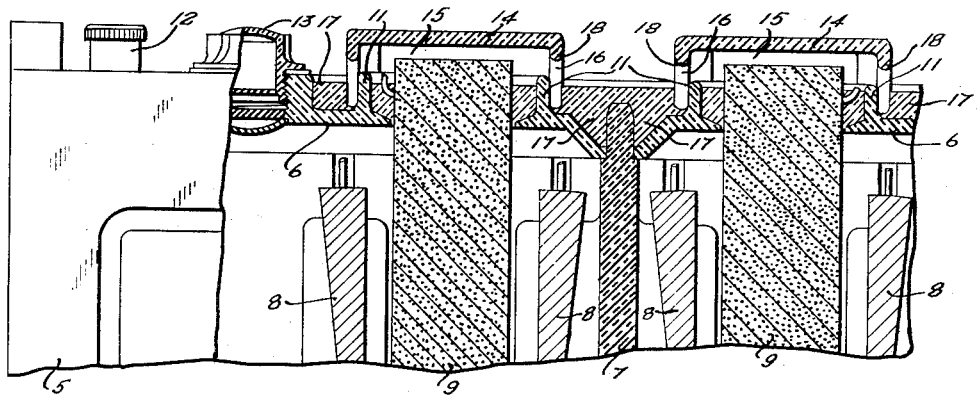
Fig. 1 is a fragmentary view, partially in section, of a battery of air depolarized cells illustrating one embodiment of my invention and showing the incorporation therewith of protective covers.
Figure 2:
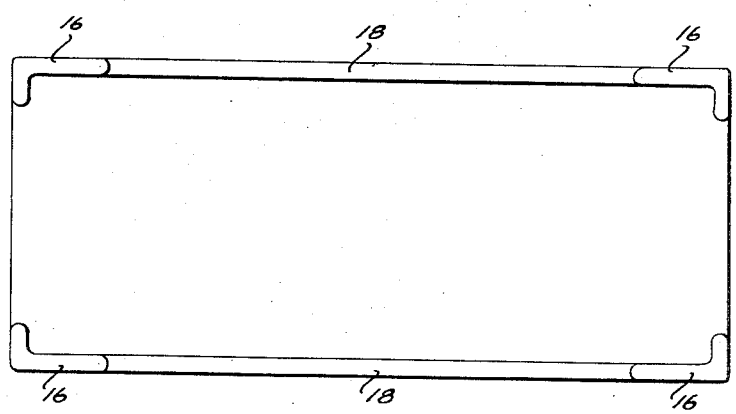
Fig. 2 is a bottom view of one form of a protective cover.
Figure 3:
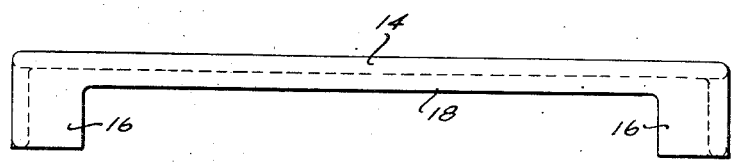
Fig. 3 is a side elevation of the cover shown in Fig. 2.

Referring to the drawing, Fig. 1 shows a battery of cells of the air depolarized type. The cells are contained within a case 5 having a top 6, and are separated from each other by cell walls 7. Each cell comprises two zinc electrodes 8 and a porous carbon electrode 9. The carbon electrode 9 protrudes through an aperture in the top 6 and is surrounded by a ridge 11 formed on the top 6. The top 6 also supports the binding post terminals 12, and the filling caps 13 which permit access to the interior of the cells.

The protective cover 14 is provided with legs 16, which rest upon the top 6 immediately outside the ridge 11, and is separated by an air space 15 from the top of the electrode 9. The cover 14 may be held in place by a seal 17 of some suitable material, or by direct mechanical union with the ridge 11 or the top 6. The form of cover illustrated has a short web portion 18 extending between the legs 16 along its sides of greater length, the remainder of these sides and the ends being open to permit the circulation of air around the end of the carbon electrode 9. The open portion may be of any suitable design which will permit circulation of air over and around the exposed end of the electrode 9.

The cover 14 may be formed of a non-conducting material or it may be formed of a conducting material insulated from the electrodes and adjacent electrode-covers by the material used as the seal. It serves not only to prevent water or other substances from penetrating the electrode, but also to minimize the possibility of a short circuit of the battery from electrode to electrode.

The invention has been disclosed in connection with a cell or battery of the air depolarized type, but it is understood that it may equally well be applied to other cells or batteries having electrodes which require a protective cover, and that many changes in the disclosed construction may be made to adapt the cover to the cell or battery with which it is to cooperate.

I claim:

1. A primary cell of the air-depolarized type having a cover, an air-permeable electrode subject to impairment by water protruding through said cover and an electrode-cover surrounding and spaced from the exposed portion of said electrode, said electrode-cover having an imperforate top to prevent access of water to the electrode and being provided with apertures at the side to allow the circulation of air therethrough.

2. A primary cell of the air-depolarized type having a cover, an air-permeable electrode subject to impairment by water protruding through said cover and an electrode-cover formed of an insulating material surrounding and spaced from the exposed portion of said electrode, said electrode-cover being provided with an imperforate top to prevent access of water to the electrode and being further provided with apertures at the side to allow the circulation of air therethrough.

3. A primary cell of the air-depolarized type having a cover, an air-permeable electrode subject to impairment by water protruding through said cover, and a ventilating electrode-cover, said electrode-cover comprising a flat body covering and spaced from the exposed portion of the electrode with which it cooperates, legs attached to said body, said legs conforming to the exterior outline of said body and web members shorter than the legs extending between said legs adjacent to the edges of said body.

4. A primary cell of the air depolarized type having a cover, an air-permeable electrode subject to impairment by water protruding through said cover, a ventilating electrode-cover formed of an insulating material, said electrode-cover comprising a flat body covering and spaced from the exposed portion of the electrode with which it cooperates, legs attached to said body, said legs conforming to the exterior outline of said body and web members shorter than the legs connecting said legs adjacent to the edges of said body.

ROBERT H. LAPIDOS.